Sept. 3, 1929.　　　J. R. GAMMETER　　　1,726,555
CONVEYER
Filed July 13, 1926　　　3 Sheets-Sheet 1
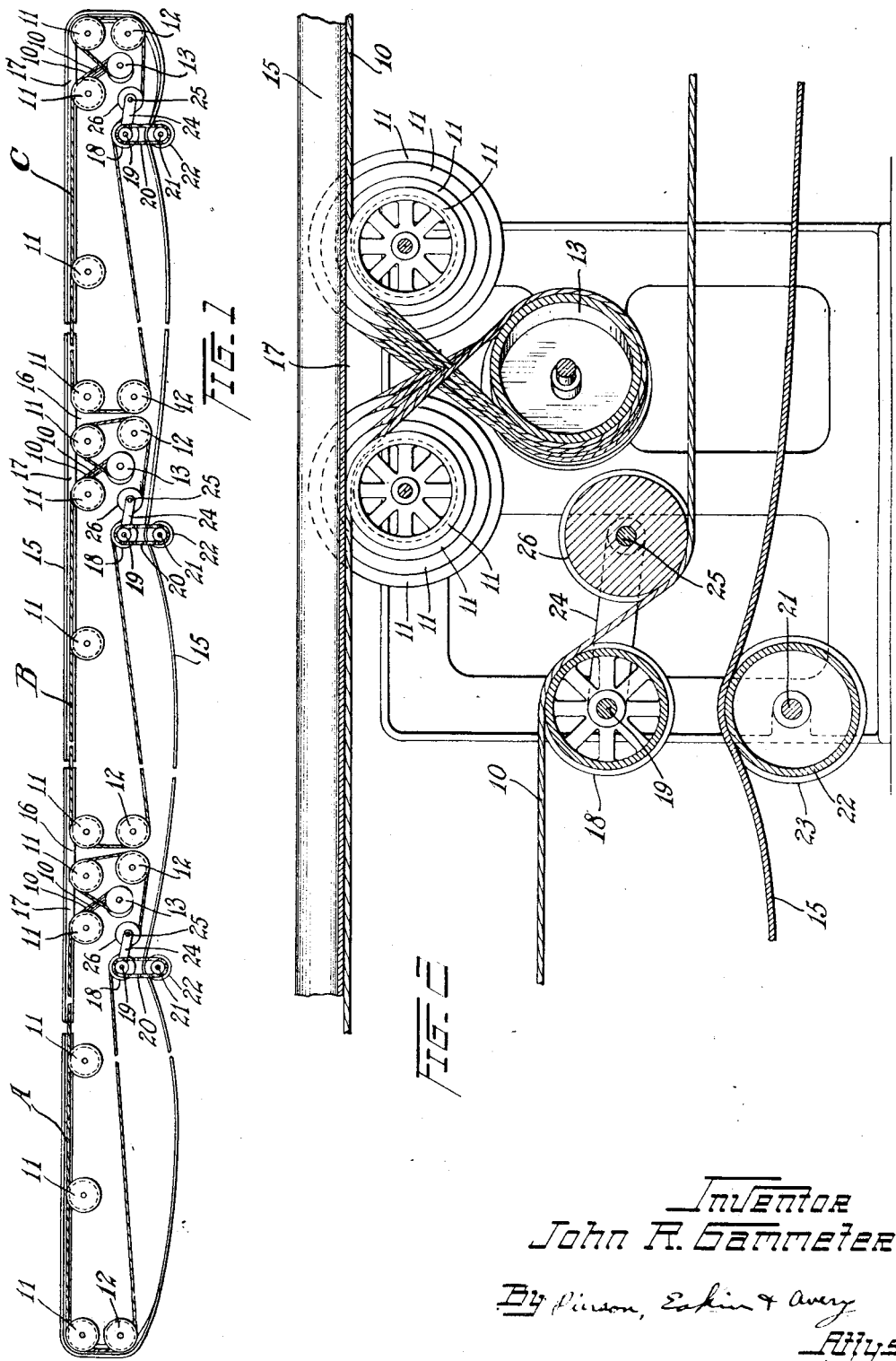

Sept. 3, 1929.    J. R. GAMMETER    1,726,555
CONVEYER
Filed July 13, 1926    3 Sheets-Sheet 2
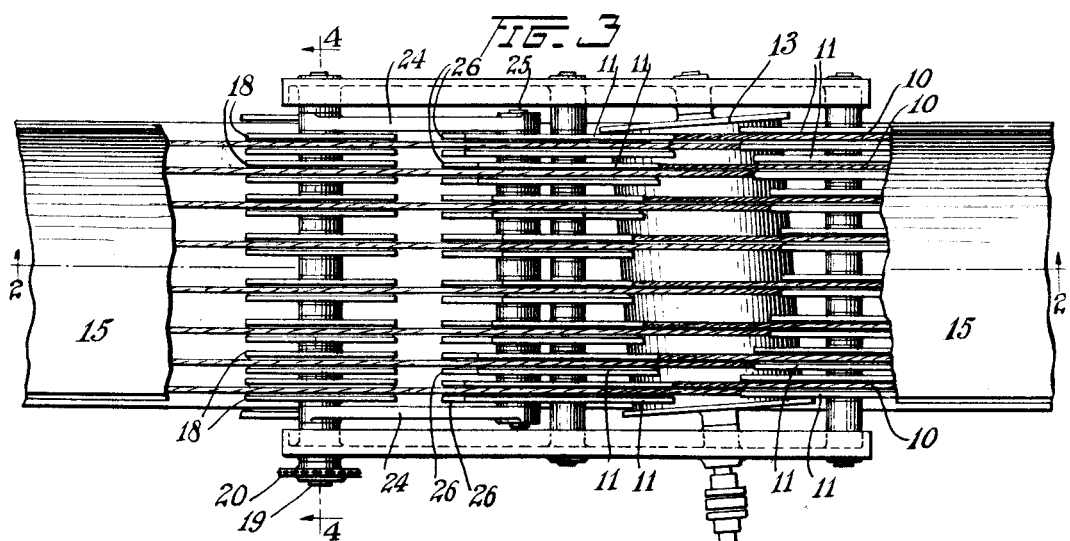
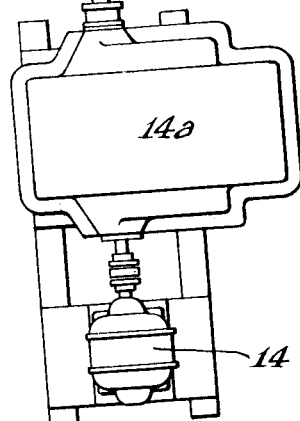
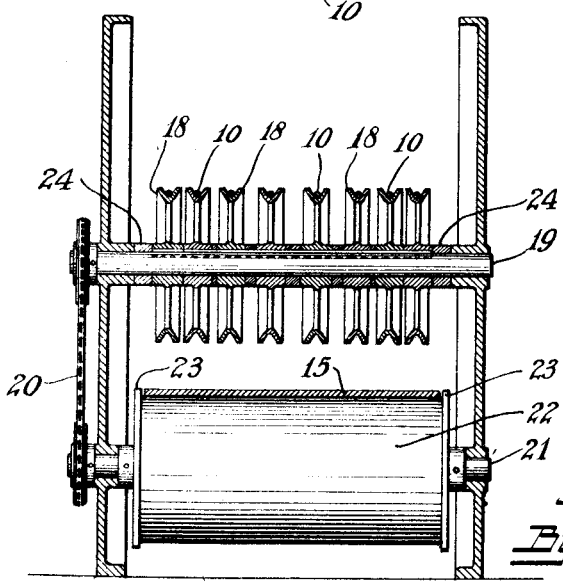
Inventor
John R. Gammeter
By Pierson, Eakin & Avery
Attys

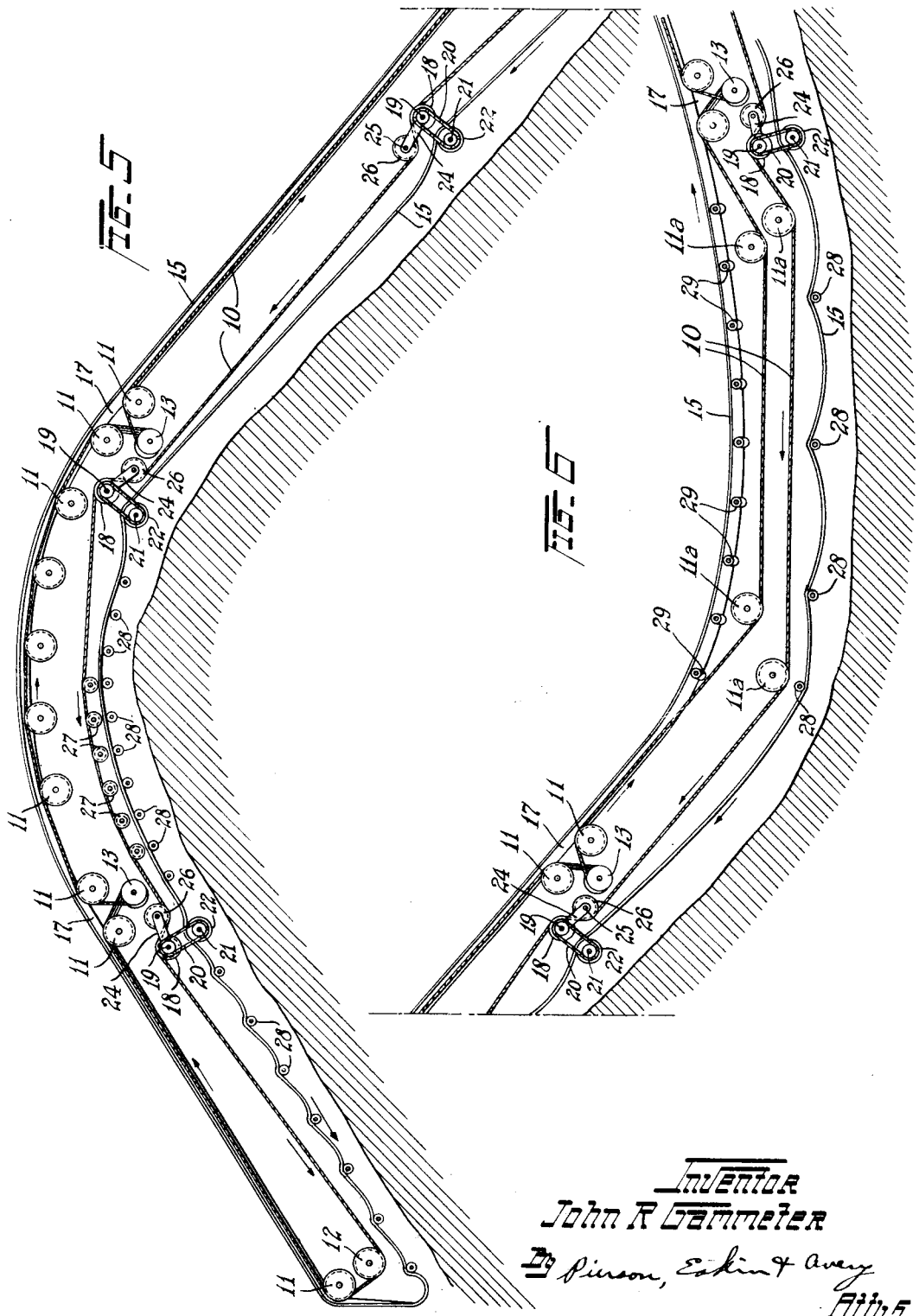

Patented Sept. 3, 1929.

1,726,555

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

CONVEYER.

Application filed July 13, 1926. Serial No. 122,092.

This invention relates to conveyers of the endless belt type and its chief objects are to provide a conveyer which may be of great length without requiring great driving strains in the endless members; which may be extended over hills and through valleys, as for conveying ores for long distances in rough mining country; which may have a continuous carrying surface throughout its length, so that the load need not be frequently dumped from one conveyer belt to another; which may comprise endless supporting and driving elements limited to comparatively short lengths of the conveyer, so that the effects of breakage and operations of repair may be localized; which may be run at high speed; and in which economy and construction and repair may be obtained.

In attaining these objects I provide, in my preferred construction, a series of cradles each comprising a set of driven, endless cables, the several cradles supporting successive portions of the upper length of a single, endless conveyer belt which runs the entire length of the series of cradles and is returned underneath the same, suitable means, such as a series of synchronous motors, being provided for driving the endless cables of the several cradles at even speeds.

Of the accompanying drawings:

Fig. 1 is a diagrammatic side elevation of a conveyer embodying my invention in its preferred form, parts being broken away to foreshorten the figure.

Fig. 2 is a fragmentary, vertical longitudinal section of the same on line 2—2 of Fig. 3.

Fig. 3 is a fragmentary plan view of the parts shown in Fig. 2.

Fig. 4 is a vertical, transverse section on line 4—4 of Fig. 3.

Fig. 5 is a diagrammatic side elevation of a reach of a conveyer constructed in accordance with my invention and extending over a hill.

Fig. 6 is a similar view, in continuation of Fig. 5, of a reach of the conveyer crossing a valley.

Referring to the drawings, and at first especially to Fig. 1, the conveyer there shown comprises a series of cradles A, B, C, the number of which may be varied, each comprising a set of endless cables 10, 10 mounted upon successive sets of supporting rollers or sheaves 11, 11 and guide rollers 12, 12. The rollers 11 of each set are of increasing diameter from the middle toward each end of the set, so as to trough the set of cables. Two successive sets of the supporting rollers 11 of each cradle are spaced close together and between them the cables 10 are looped about a cylindrical drive roll or sheave 13, which is preferably mounted in a slightly oblique position, as shown clearly in Fig. 3, to prevent chafing of the cables. Synchronous motors adapted to be driven at equal speeds are connected to the respective drive rolls 13, one of the motors, provided with a reduction gear $14^a$, being shown at 14 in Fig. 3.

Resting upon the upper reaches of the cradles and extending about the entire series of the same is an endless conveyer belt 15, which may be of comparatively light construction and preferably has a wear-resisting, load-receiving surface of rubber or like material, the belt preferably being of such length with respect to the series of cradles as to ride upon the cables without being subjected to substantial tension. The successive cradles are positioned with only short spaces between them, as shown at 16, 16, so that the belt passes from one cradle to the next with only a short intervening reach of belt not directly supported from beneath by the cables, and the close spacing of the adjacent rollers 11 provide the same effect at 17, 17, where the cables pass about the drive rolls 13 between the closely spaced supporting rollers 11.

The return reaches of the cables 10 of each set pass over a set of grooved guide rollers 18, 18 secured upon a shaft 19 which is connected by a sprocket chain 20 with the shaft 21 of a cylindrical supporting and driving roll 22 for the return reach of the endless belt, and each of the rolls 22 is preferably formed with end flanges 23, 23 to guide the belt.

Hinged upon each shaft 19 are a pair of arms 24, 24 whose outer ends are connected by a shaft 25 for a set of grooved tightener rolls 26, 26 for the respective cables 10.

In the installation shown in Figs. 5 and 6, where the conveyer runs over a hill and through a hollow, and consequently has an undulating course, the return reaches of the cables between the successive sets of supporting rollers 18 are held to their proper course by idler rollers 27, 27 and the return reaches of the belt between the successive supporting and driving rolls 22 are held to their proper course by idler rolls 28, 28.

Where the conveyer extends across a hollow, as in Fig. 6, the cables 10 may be mounted to run under idler rollers 11ª, 11ª, so that the cables may be kept taut in their downwardly-bowed positions, and the belt in that region may be mounted to run upon closely spaced sets of idler rolls 29, 29. The upper reaches of the cables also, or alternatively, may be held to their proper course by the interposition of sets of the local roll assemblies which include the rolls 13, and permissibly more than one of the synchronous motors may be employed for driving each set of cables.

In the operation of the conveyer, all of the cables of all of the cradles are driven at even speed by the cylindrical rolls 13, notwithstanding the different diameters of the supporting and guiding rollers 11, since the latter are loosely journaled, and the troughed belt 15 is consequently propelled by the underlying cables without any very considerable longitudinal driving strain therein.

As the carrying belt is continuous throughout the succession of cradles the load may be carried a great distance without being dumped from one carrying belt to another, and consequently the conveyer may be driven at a higher speed than a succession of conveyers which dump the load from one to another, and this feature provides a high carrying capacity and also avoids breaking up and the reduction of particle size of materials such as coal, for example.

The provision of successive cradles for the single belt simplifies the problem of extending the conveyer over hills and across valleys, since the rolls at the ends of each cradle compel the cables to pass fixed stations.

As each crade is required to drive only a comparatively short reach of the belt the cables do not require to be subjected to very great driving strains, and repair or replacement of a broken cable is a local and comparatively simple matter.

Other advantages will be manifest to those skilled in the art, such as the provision of driving means for the cables intermediate the terminals of each cradle, which permits the close spacing of the successive cradles and avoidance of long suspended reaches of the belt, and conveniently provides for driving the cables at equal speed while employing end pulleys of different diameters for the several cables.

Modifications may be employed without departure from the scope of the invention, and I do not wholly limit my claims to the specific construction shown.

I claim:

1. A conveyer comprising a cradle of endless cables, rollers over which the cables run and by which they are held at determinate elevations at spaced apart positions, held-down means adapted to keep the cables determinately depressed at an intermediate position, a carrier-belt mounted upon the said cradle, and supporting rolls directly supporting the belt over the depressed portion of the cable.

2. A conveyer comprising an endless carrier-belt and a succession of members underlying substantially all of and supporting the load-carrying reach of the belt, each of said members being adapted to travel with the belt in an orbital movement extending longitudinally of the belt, and the succession of members defining an undulating path for the belt.

3. A conveyer comprising a troughed cradle of endless cables and a drive roll for the cables positioned out of alignment with the supporting rollers but intermediate the terminals of the cradle, the cables being looped about the drive roll so as to pass completely around the same and the drive roll being positioned obliquely with relation to the cradle so as to avoid chafing of the cables.

In witness whereof I have hereunto set my hand this 8th day of July, 1926.

JOHN R. GAMMETER.

and driving rolls 22 are held to their proper course by idler rolls 28, 28.

Where the conveyer extends across a hollow, as in Fig. 6, the cables 10 may be mounted to run under idler rollers 11ª, 11ª, so that the cables may be kept taut in their downwardly-bowed positions, and the belt in that region may be mounted to run upon closely spaced sets of idler rolls 29, 29. The upper reaches of the cables also, or alternatively, may be held to their proper course by the interposition of sets of the local roll assemblies which include the rolls 13, and permissibly more than one of the synchronous motors may be employed for driving each set of cables.

In the operation of the conveyer, all of the cables of all of the cradles are driven at even speed by the cylindrical rolls 13, notwithstanding the different diameters of the supporting and guiding rollers 11, since the latter are loosely journaled, and the troughed belt 15 is consequently propelled by the underlying cables without any very considerable longitudinal driving strain therein.

As the carrying belt is continuous throughout the succession of cradles the load may be carried a great distance without being dumped from one carrying belt to another, and consequently the conveyer may be driven at a higher speed than a succession of conveyers which dump the load from one to another, and this feature provides a high carrying capacity and also avoids breaking up and the reduction of particle size of materials such as coal, for example.

The provision of successive cradles for the single belt simplifies the problem of extending the conveyer over hills and across valleys, since the rolls at the ends of each cradle compel the cables to pass fixed stations.

As each crade is required to drive only a comparatively short reach of the belt the cables do not require to be subjected to very great driving strains, and repair or replacement of a broken cable is a local and comparatively simple matter.

Other advantages will be manifest to those skilled in the art, such as the provision of driving means for the cables intermediate the terminals of each cradle, which permits the close spacing of the successive cradles and avoidance of long suspended reaches of the belt, and conveniently provides for driving the cables at equal speed while employing end pulleys of different diameters for the several cables.

Modifications may be employed without departure from the scope of the invention, and I do not wholly limit my claims to the specific construction shown.

I claim:

1. A conveyer comprising a cradle of endless cables, rollers over which the cables run and by which they are held at determinate elevations at spaced apart positions, held-down means adapted to keep the cables determinately depressed at an intermediate position, a carrier-belt mounted upon the said cradle, and supporting rolls directly supporting the belt over the depressed portion of the cable.

2. A conveyer comprising an endless carrier-belt and a succession of members underlying substantially all of and supporting the load-carrying reach of the belt, each of said members being adapted to travel with the belt in an orbital movement extending longitudinally of the belt, and the succession of members defining an undulating path for the belt.

3. A conveyer comprising a troughed cradle of endless cables and a drive roll for the cables positioned out of alignment with the supporting rollers but intermediate the terminals of the cradle, the cables being looped about the drive roll so as to pass completely around the same and the drive roll being positioned obliquely with relation to the cradle so as to avoid chafing of the cables.

In witness whereof I have hereunto set my hand this 8th day of July, 1926.

JOHN R. GAMMETER.

CERTIFICATE OF CORRECTION.

Patent No. 1,726,555.　　　　　　　　　　Granted September 3, 1929, to

JOHN R. GAMMETER.

It is hereby certified that error appears in the printed specification of the above numbered patent requiring correction as follows: Page 1, line 18, for the word "and" first occurrence read "of"; page 2, line 65, claim 1, for the word "held" read "hold"; and that the said Letters Patent should be read with these corrections therein that the same may conform to the record of the case in the Patent Office.

Signed and sealed this 1st day of April, A. D. 1930.

(Seal)

M. J. Moore,
Acting Commissioner of Patents.